PROCESS FOR THE CONVERSION OF SEA WATER FOR IRRIGATION PURPOSES

Sidney M. Heins, 7132 N. Ashland Ave., Chicago, Ill. 60626
No Drawing. Filed Jan. 6, 1964, Ser. No. 336,074
4 Claims. (Cl. 71—1)

The present invention relates to a method of converting sea water into usable irrigation water by displacing the detrimental mineral content of the sea water with innocuous mineral salts which are widely available in nature. The term "sea water" as employed herein is intended to be generic so as to include all forms of ground water, whether the latter be derived from an ocean, sea or inland salt lake.

While the mineral content of sea water will vary in different localities, the average quantity of mineral salts found in raw sea water is approximately 3.5%, common salt being approximately 2.5% and the remainder being chiefly composed of compounds of calcium, magnesium and iron, with a small percentage of a very large number of other compounds. The percentage of dissolved salts is higher in connection with certain inland salt lakes where the mineral salts therein may be as high as 5%.

The process of the present invention is predicated upon the fact that by adding wet process nitric acid and ammonia to raw sea water substantially all chlorides in the sea water are converted to nitrates if the proportions involved are maintained in stoichiometric balance. The process, however, need not be an exact one insofar as proportions are concerned, it being necessary only that displacement of the chlorides be carried out to such an extent that the resultant liquid be innocuous to plant-life despite the fact that it may contain a slight chloride or nitrate excess.

The invention is further predicated upon the availability of the necessary nitrogen from the atmosphere and also of the availability of several commercially feasible synthetic processes whereby such nitrogen may be extracted from the atmosphere and converted into usable ammonium nitrate.

Among the available processes for the synthetic production of ammonium nitrate, and certainly the most economical known process, is the Haber process which is universally employed in industry. Such a process is capable of being set into operation at any desired location in the vicinity of the body of salt water to be treated so that water pumping problems are at a minimum.

It is contemplated that the present process may be either a batch process, involving, for example, an aggregate batch of 10,000 gallons of sea water, or a continuous process. The solution of nitric acid and ammonia (which yields ammonium nitrate), when added to the raw sea water, will produce the necessary reaction almost instantaneously in any climate and requires for its completion neither the addition of heat nor the use of a catalyst. The reaction is a normal one and requires no mechanical agitation other than that which normally occurs by the interflow of the two liquid bodies involved.

The reaction which takes place when aqueous solutions of sodium chloride and ammonium nitrate are combined may be expressed by the formula:

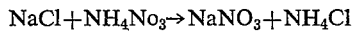

$$NaCl + NH_4NO_3 \rightarrow NaNO_3 + NH_4Cl$$

The above formula is based solely upon the sodium chloride content of the sea water involved and for the other chlorides, such as potassium chloride, magnesium chloride, ferrous chloride, similar reactions take place whereby the chlorides are displaced by nitrates, the metallic elements remaining in the combination.

According to the present process, it is not necessary that careful attention be given to exact proportions either by weight or volume. While stoichiometric conditions are desirable, a slight excess of sodium chloride in the resultant solution is not detrimental to plant growth. On the other hand, a considerable excess of ammonium chloride is not detrimental to plant growth and, therefore, in carrying out the present process, the use of slight excess of ammonium nitrate may be resorted to with impunity.

In carrying out the process, in the event that an unduly high percentage of ammonium chloride presents itself in the aqueous solution intended for irrigation purposes, sufficient potassium sulfate may be added to the solution so that the resultant aqueous ammonium sulphate and potassium chloride solution will, when employed for irrigation purposes, furnish a fertilizing effect on the plant-life in addition to having the desired water content. The reaction which takes place in such an instance may be expressed by the formula:

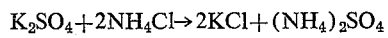

$$K_2SO_4 + 2NH_4Cl \rightarrow 2KCl + (NH_4)_2SO_4$$

All or any part of the ammonium chloride may be displaced in this manner by the addition of potassium sulfate, but in any event, the reduction in the ammonium chloride content must be sufficient for the purposes intended, i.e., to render the resultant solution innocuous to plant-life.

As previously stated, due to the fact that the chemical reactions set forth above are reactions that require neither heat nor catalysts for their initiation, acceleration or continuance, and which may be conducted at climatic temperatures compatible with irrigation operations and without forced agitation, few mechanical problems arise in connection with the successful conduction of the process. If desired, the sea water may be drawn off or pumped from the principal body of salt water, collected in a basin, and the chemical reagents added to the thus isolated body of sea water. After the desired displacement of salts has taken place, the resultant irrigation water may be drawn off by sluices or pumped to the irrigation field. The process, therefore, is in no way limited by mechanical or procedural steps and such steps as may be necessary will readily suggest themselves to those skilled in the art as expediency dictates.

The invention, therefore, is not to be limited to the use of any particular equipment for carrying out the herein described process of rendering sea water suitable for irrigation purposes, nor is it to be limited to exact proportions of the various reagents mentioned in describing the process. While stoichiometric combinations of the chlorides and nitrates involved are desirable, deviation from such stoichiometric combinations, within limits that are not detrimental to plant growth, are tolerable and may be permitted within the scope of the appended claims.

Having thus described the invention what I claim as new and desire to secure by Letters Patent is:

1. In a salt displacement process for the large-scale conversion of raw sea water to irrigation use, the steps which comprise combining with the sea water ammonium nitrate in an amount sufficient to convert a major portion of the chloride content of the sea water to a nitrate content for rendering the resulting liquid innocuous to plant life, and recovering the resulting liquid.

2. In a salt displacement process for the large-scale conversion of raw sea water to irrigation use, the steps which comprise combining with the sea water ammonium nitrate in an amount sufficient to convert all of the chloride content of the sea water to a nitrate content and yield an excess of ammonium chloride, and thereafter combining with the resultant solution potassium sulphate in an amount sufficient to convert the excess chloride content of the ammonium chloride to a sulphate content.

3. In a salt displacement process for the large-scale conversion of raw sea water containing sodium chloride in solution to irrigation use, the steps which comprise isolating a quantity of sea water, adding to said isolated quantity of sea water a quantity of ammonium nitrate sufficient to react substantially stoichiometrically with the sodium chloride and produce an aqueous solution of sodium nitrate and ammonium chloride, and recovering the resulting liquid.

4. A process as defined in claim 1 and wherein ammonium nitrate is combined in an amount at least about sufficient to convert all of the chloride content of the sea water to a nitrate content.

References Cited
UNITED STATES PATENTS

| | | | |
|---|---|---|---|
| 1,955,031 | 4/1934 | Steudemann | 23—100 |
| 2,934,419 | 4/1960 | Cook | 71—1 |
| 3,042,606 | 7/1962 | Salutsky et al. | 210—28 |
| 3,232,703 | 2/1966 | Thompson et al. | 71—61 |

MORRIS O. WOLK, *Primary Examiner.*

E. G. WHITBY, *Assistant Examiner.*